United States Patent
Hsieh et al.

(10) Patent No.: US 8,193,853 B2
(45) Date of Patent: Jun. 5, 2012

(54) EFFICIENCY AND THERMAL IMPROVEMENT OF A CHARGE PUMP BY MIXING DIFFERENT INPUT VOLTAGES

(75) Inventors: Wei-Lun Hsieh, Kaohsiung (TW);
Hung-Sung Chu, Kaohsiung (TW);
Der-Jiunn Wang, Hsinchu (TW);
Kuo-Chen Tsai, Hsinchu (TW);
Wei-Hsin Wei, Jhubei (TW)

(73) Assignee: Richtek Technology Corp., Hsinchu (TW)

( * ) Notice: Subject to any disclaimer, the term of this patent is extended or adjusted under 35 U.S.C. 154(b) by 22 days.

(21) Appl. No.: 12/816,613

(22) Filed: Jun. 16, 2010

(65) Prior Publication Data
US 2010/0321099 A1    Dec. 23, 2010

(30) Foreign Application Priority Data

Jun. 22, 2009   (TW) ............................. 98120824 A (51) Int. Cl.
*G05F 1/10* (2006.01)
(52) U.S. Cl. ......................................... 327/536; 363/60
(58) Field of Classification Search .................. 327/536; 363/60
See application file for complete search history.

(56) References Cited

U.S. PATENT DOCUMENTS

| | | | |
|---|---|---|---|
| 5,272,393 A * | 12/1993 | Horiguchi et al. | 327/535 |
| 6,011,426 A * | 1/2000 | Seung-Ho | 327/536 |
| 6,359,797 B1 * | 3/2002 | Bayer et al. | 363/60 |
| 6,411,531 B1 * | 6/2002 | Nork et al. | 363/60 |
| 6,483,282 B1 * | 11/2002 | Bayer | 323/315 |
| 6,650,555 B2 * | 11/2003 | Suzuki et al. | 363/60 |
| 6,992,463 B2 * | 1/2006 | Yoshio | 320/134 |
| 7,271,642 B2 * | 9/2007 | Chen et al. | 327/514 |
| 7,304,871 B2 * | 12/2007 | Ito et al. | 363/59 |
| 7,427,888 B2 * | 9/2008 | Zhang et al. | 327/536 |
| 7,474,141 B2 * | 1/2009 | Huang et al. | 327/536 |
| 7,560,915 B2 * | 7/2009 | Ito et al. | 323/282 |
| 7,663,428 B2 * | 2/2010 | Matano | 327/536 |
| 7,768,340 B2 * | 8/2010 | Ko et al. | 327/536 |
| 7,796,125 B2 * | 9/2010 | Morita | 345/211 |
| 7,855,532 B2 * | 12/2010 | Fujiwara | 320/140 |
| 7,956,673 B2 * | 6/2011 | Pan | 327/530 |
| 2006/0114053 A1 * | 6/2006 | Sohara et al. | 327/536 |
| 2006/0170486 A1 * | 8/2006 | Tranchina et al. | 327/536 |
| 2008/0100272 A1 * | 5/2008 | Yoshio | 323/266 |
| 2008/0205134 A1 * | 8/2008 | Kato | 365/185.2 |
| 2008/0238536 A1 * | 10/2008 | Hayashi et al. | 327/537 |
| 2011/0148385 A1 * | 6/2011 | North et al. | 323/304 |
| 2011/0156805 A1 * | 6/2011 | Kwon | 327/536 |

\* cited by examiner

*Primary Examiner* — Thomas J Hiltunen
(74) *Attorney, Agent, or Firm* — Muncy, Geissler, Olds & Lowe, PLLC (57) ABSTRACT

For a charge pump, a control circuit switches two or more input voltages to apply to one or more pumping capacitors under auto-sensing control to modulate a maximum pumping voltage as close as to a demanded output voltage to thereby reduce the difference between the maximum pumping voltage and the output voltage for efficiency and thermal improvement of the charge pump. The maximum pumping voltage is produced by mixing the different input voltages and the charge pump may provide more operation modes.

11 Claims, 9 Drawing Sheets

EFFICIENCY AND THERMAL IMPROVEMENT OF A CHARGE PUMP BY MIXING DIFFERENT INPUT VOLTAGES

FIELD OF THE INVENTION

The present invention is related generally to a charge pump and, more particularly, to a control circuit and method for a charge pump for efficiency and thermal improvement thereof.

BACKGROUND OF THE INVENTION

Figure 1:
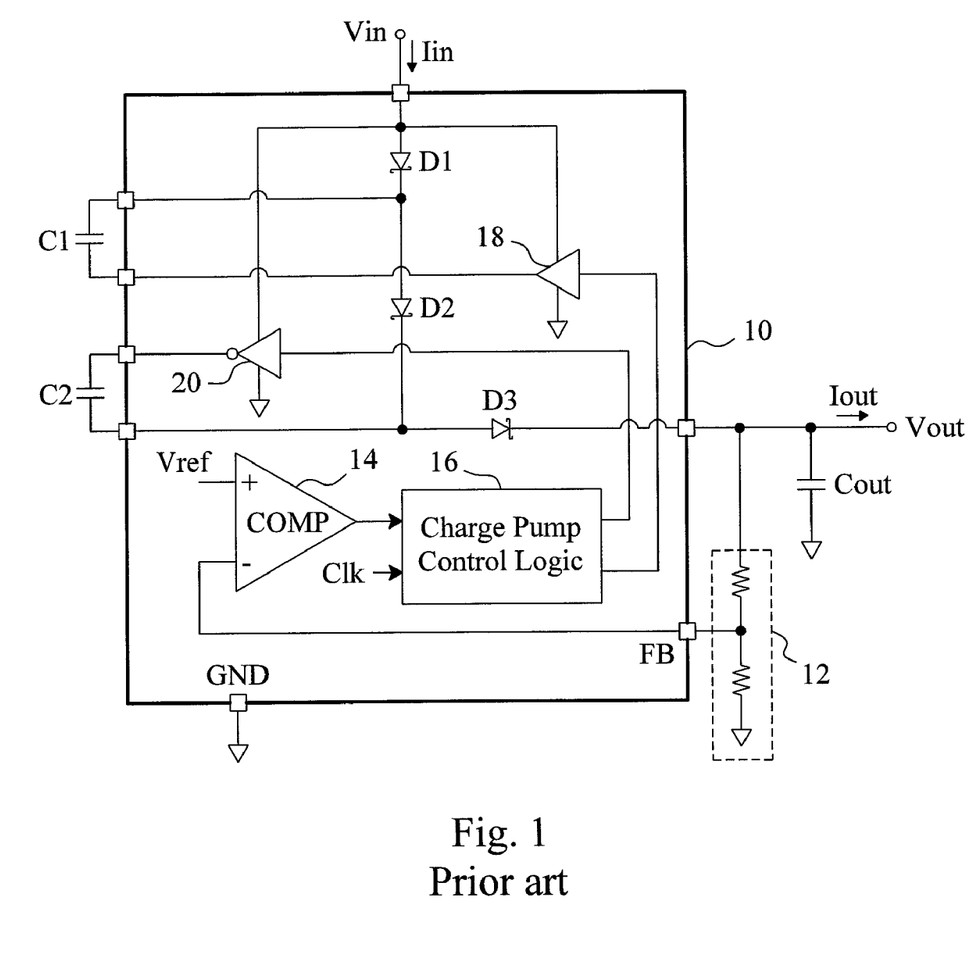
FIG. 1 is a circuit diagram of a conventional voltage-tripler charge pump.

Electronic circuits nowadays tend to require more than one direct-current (DC) voltage power supply and hence, many systems have been developed for providing power conversion, one of which is the charge pump. A charge pump, also known as a switched-capacitor converter, includes one or more pumping capacitors, an output stage having two or more diodes or switches, an output capacitor, and a control circuit for switching different current paths in the charge pump, and is operative to generate different output voltages stepped up or stepped down from a DC voltage. For instance, FIG. 1 is a circuit diagram of a charge pump configured as a voltage tripler. A voltage-tripler charge pump refers to a charge pump capable of generating an output voltage Vout up to three times as high as the DC input voltage Vin. The operation of a charge pump includes charging (energy storage) and discharging (energy transfer) of its pumping capacitor(s). For example, in FIG. 1, a charge pump chip 10 has a feedback pin FB connected to a feedback circuit 12 to receive a feedback signal FB, and a comparator 14 compares the feedback signal FB with a target value Vref to generate a comparison signal for a charge pump control logic 16 to determine an operation mode and control signals for drivers 18 and 20, and by using the drivers 18 and 20 to alternately switch different current paths and diodes D1, D2 and D3 to constrain the direction of current flow, charges and discharges pumping capacitors C1 and C2 to generate the output voltage Vout at an output capacitor Cout.

Figure 2:
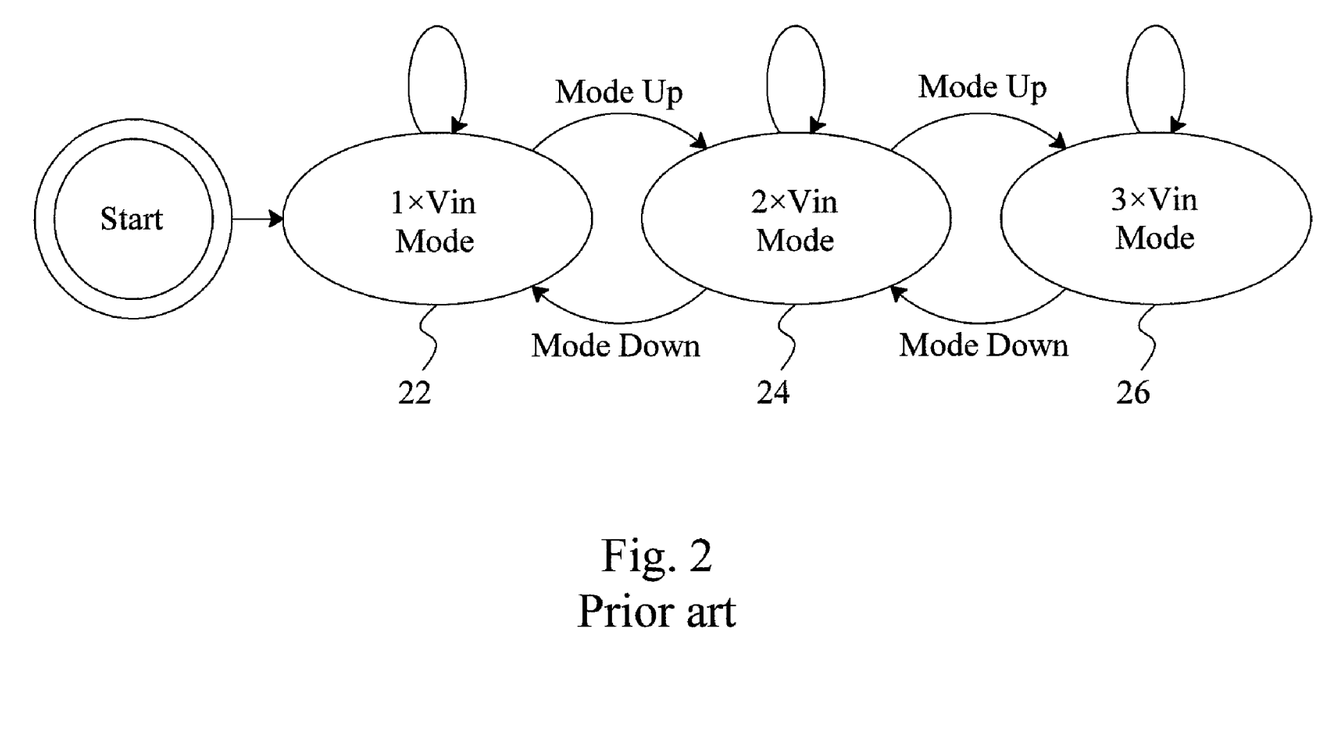
FIG. 2 is a mode transition chart of the charge pump shown in FIG. 1.

A charge pump usually has three or more operation modes, and the maximum pumping voltage of each mode is an integer times the source voltage. For instance, the charge pump shown in FIG. 1 has an original voltage (×1) mode 22, a voltage doubler (×2) mode 24, and a voltage tripler (×3) mode 26 for providing a maximum pumping voltage of 1×Vin, 2×Vin, and 3×Vin, respectively, as shown in FIG. 2. In the ×1 mode 22, the drivers 18 and 20 keep one terminal of each of the pumping capacitors C1 and C2 at the ground potential, so the pumping capacitors C1 and C2 function as the output capacitor Cout. In the ×2 mode 24, the driver 20 keeps one terminal of the pumping capacitor C2 at the ground potential such that the pumping capacitor C2 functions as the output capacitor Cout, and only the pumping capacitor C1 is used for pumping voltage. In the ×3 mode 26, the pumping capacitor C1 is charged to a certain voltage and then discharged, thereby pulling high the potential of the pumping capacitor C1 by Vin, i.e., the voltage of the voltage source Vin. As a result, a voltage higher than Vin is generated for charging the pumping capacitor C2. When the pumping capacitor C2 is discharged, recharging of the pumping capacitor C1 resumes, and at the same time, the potential of the pumping capacitor C2 is pulled high by Vin, thereby generating a voltage higher than 2×Vin for charging the output capacitor Cout. After that, the pumping capacitor C2 is recharged. The mode transition is accomplished by controlling the drivers 18 and 20 by the charge pump control logic 16 shown in FIG. 1.

In practice, however, the demand is not necessarily an integer times of the supply voltage Vin. In order to provide an adequate output voltage Vout, the charge pump must operate in a mode whose maximum pumping voltage is higher than the demand. For instance, if the demanded voltage is between two times and three times of the supply voltage Vin, the charge pump will operate in the ×3 mode. As shown FIG. 1, according to the feedback signal FB, the comparator 14 signals the charge pump control logic 16 to control the drivers 18 and 20 for the output voltage Vout to reach the target value. In general, a charge pump has the efficiency $$\eta = (V_{out} \times I_{out})/(V_{in} \times I_{in}), \quad [\text{Eq-1}]$$

where Vout is the stable output voltage of the charge pump, Iout is the output loading current of the charge pump, Vin is the DC input voltage of the charge pump, and Iin is the input current of the charge pump. As the output voltage Vout is locked by the feedback loop, a charge pump will have an ideal maximum efficiency $$\eta = V_{out}/(N \times V_{in}), \quad [\text{Eq-2}]$$

where N is the maximum multiplication factor of the charge pump. According to the equation Eq-2, the closer to the maximum pumping voltage N×Vin the output voltage Vout is, the more efficient the charge pump will be. For instance, the charge pump shown in FIG. 1 has a maximum efficiency $$\eta = V_{out}/(3 \times V_{in}). \quad [\text{Eq-3}]$$

If the charge pump shown in FIG. 1 operates to provide an output voltage Vout lower than its maximum pumping voltage 3×Vin, part of the power will be consumed by the elements D1, D2 and D3 of the output stage and converted into heat. The heat generated by the Schottky diodes D1, D2 and D3 will raise the internal temperature of the charge pump chip 10 if these diodes D1, D2 and D3 are integrated in the charge pump chip 10, as shown in FIG. 1. However, the same heat is less likely to affect the charge pump chip 10 if these diodes D1, D2 and D3 are outside the charge pump chip 10. In addition, the Schottky diodes, once integrated into the charge pump chip 10, tend to increase the area of the chip significantly and incur an excessively high parasitic resistance. Therefore, Schottky diodes are preferably used in the form of external elements when constituting the output stage of a charge pump; nevertheless, such use of Schottky diodes will increase the volume and costs of the resultant charge pump.

Figure 3:
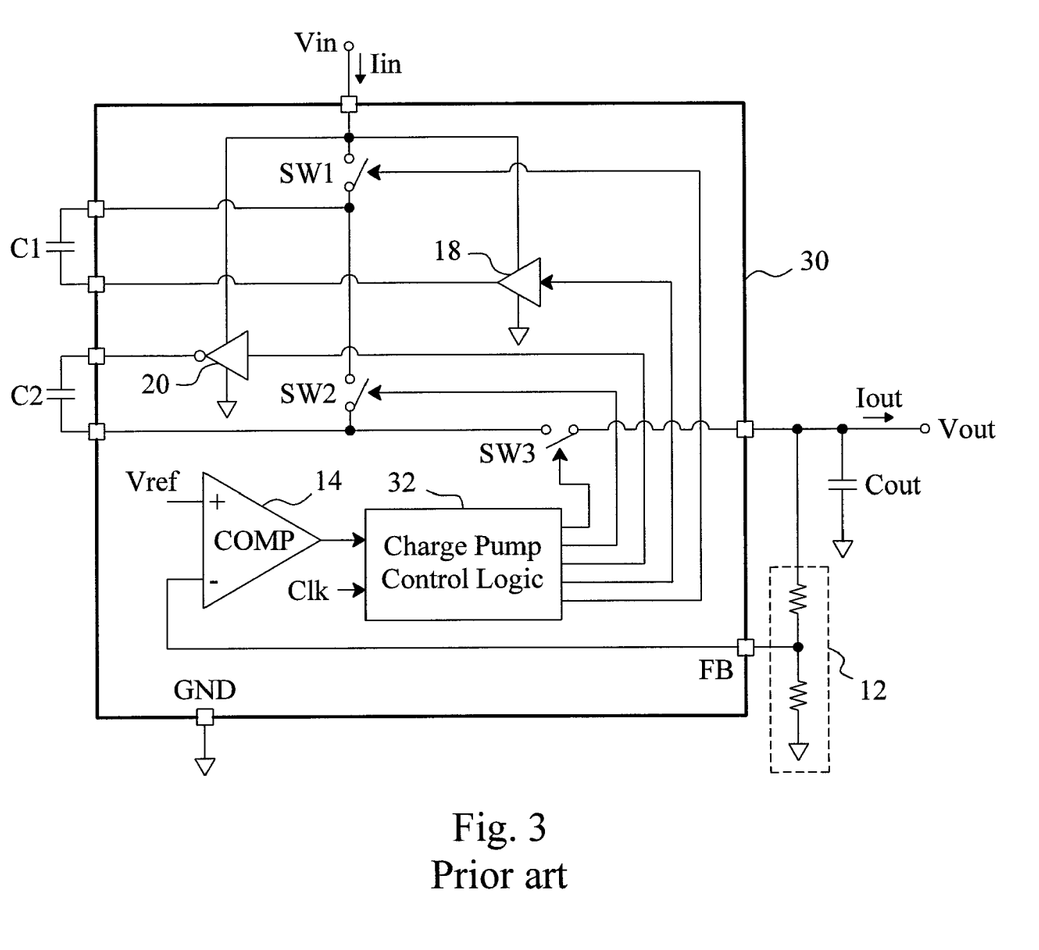
FIG. 3 is a circuit diagram of another conventional voltage-tripler charge pump.

If the output stage is implemented by power MOSFETs instead, such as the switches SW1, SW2 and SW3 shown in FIG. 3, the output stage can be incorporated into a charge pump chip 30 without increasing the volume and costs of the resultant charge pump; apart from that, this charge pump will have better performance than the charge pump shown in FIG. 1. However, the charge pump chip 30 requires a more complicated charge pump control logic 32 for controlling the switches SW1, SW2 and SW3, and the power consumed by the switches SW1, SW2 and SW3 will still generate heat that increases the temperature inside the charge pump chip 30.

SUMMARY OF THE INVENTION

An object of the present invention is to improve efficiency of a charge pump.

An object of the present invention is to reduce heat generated by an output stage of a charge pump.

An object of the present invention is to prevent high temperature inside a charge pump chip.

According to the present invention, a charge pump modulates its maximum pumping voltage by mixing two or more different input voltages with auto-sensing control. The charge pump reduces the difference between its maximum pumping voltage and output voltage and thereby has higher efficiency and lower proportion of its power consumption by its output stage. By mixing different input voltages to generate its maximum pumping voltage, the charge pump can provide more operation modes.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 4:
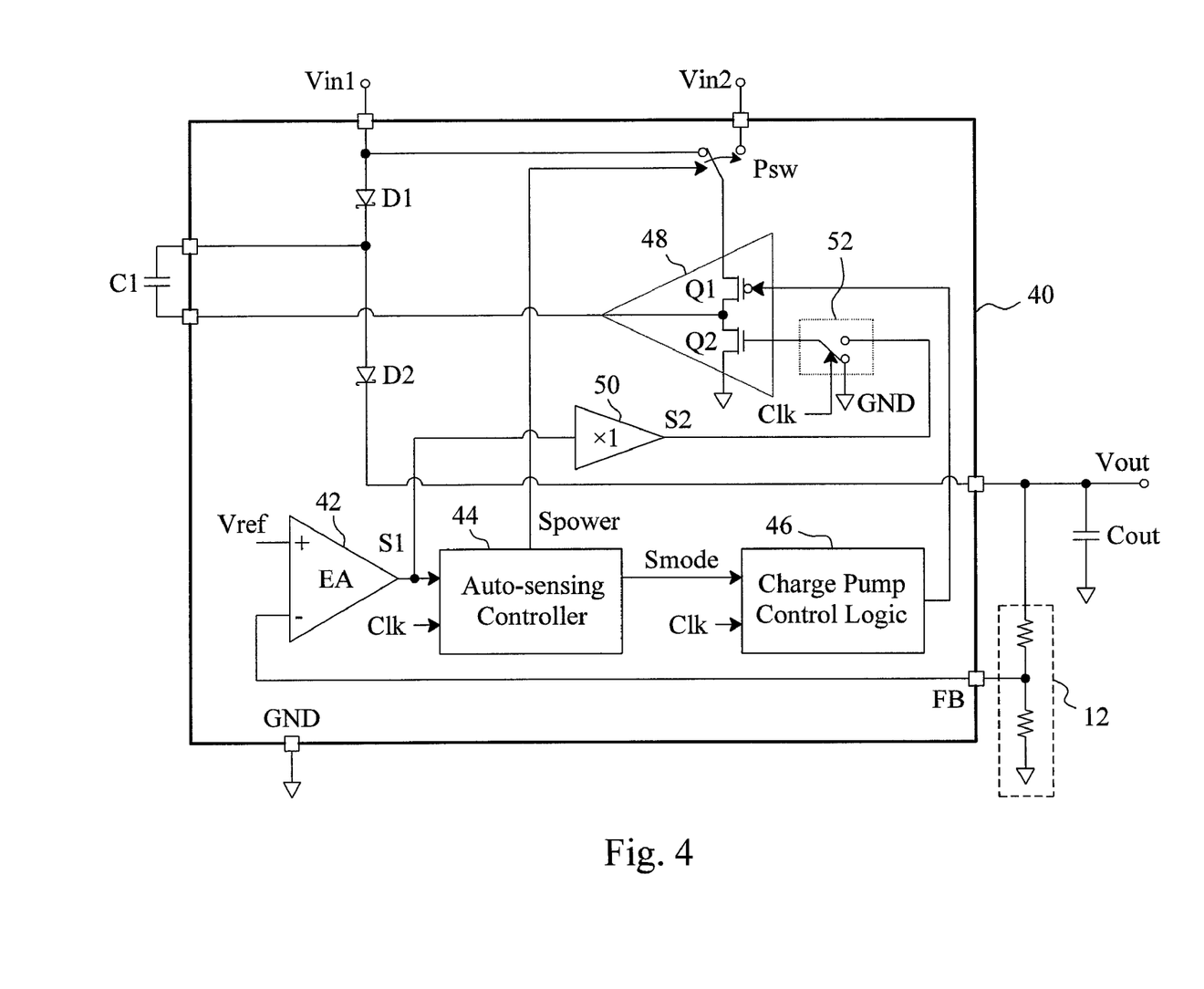
FIG. 4 is a circuit diagram of a first embodiment charge pump according to the present invention.
Figure 5:
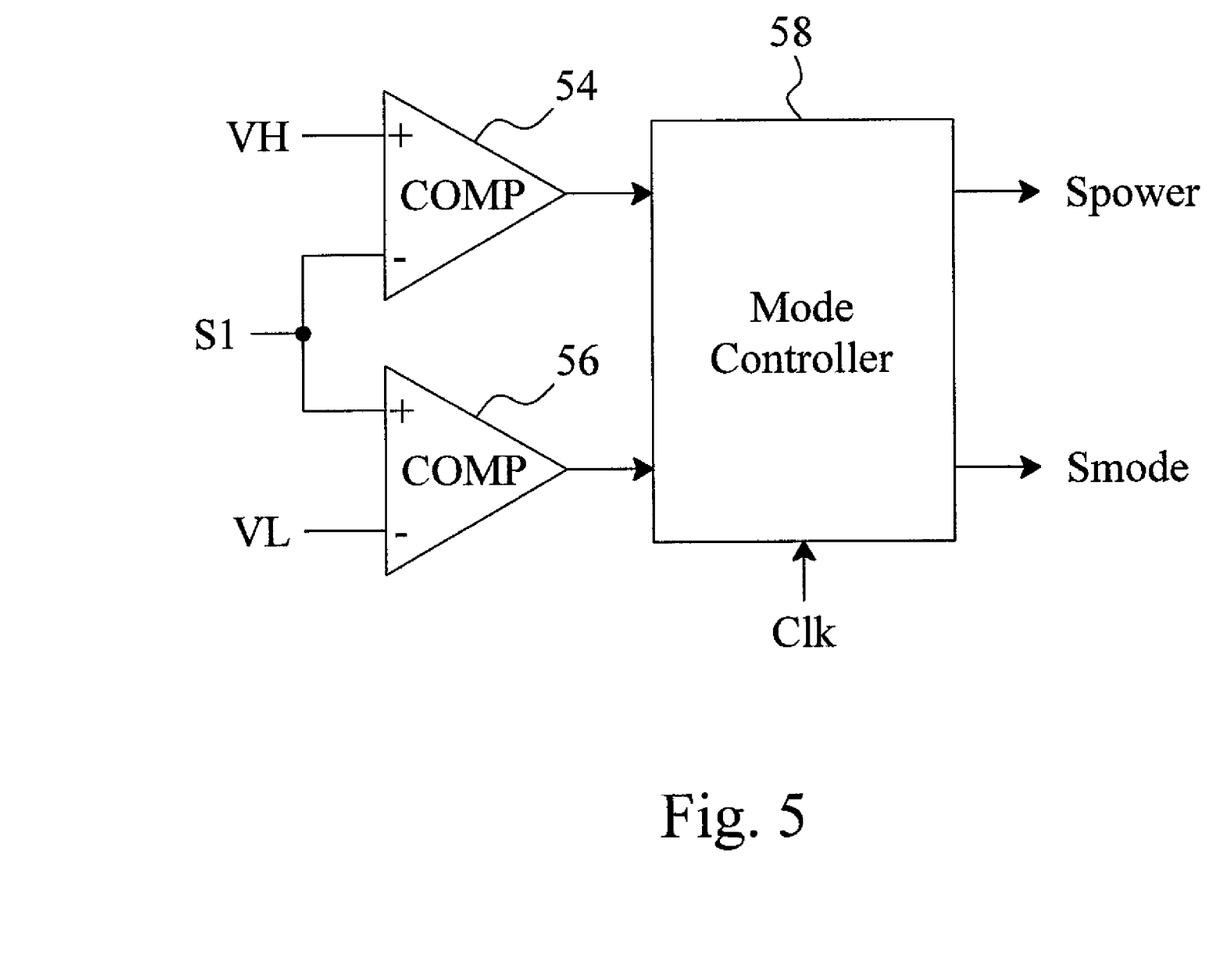
FIG. 5 is a circuit diagram of an embodiment for the auto-sensing controller shown in FIG. 4.

FIG. 4 is a circuit diagram of a voltage-doubler charge pump according to the present invention, which has two power input terminals Vin1 and Vin2 for receiving two different input voltages, respectively. As is well known, a feedback circuit 12 is connected to a power output terminal Vout of the charge pump to generate a feedback signal FB which is related to, for example, in proportion to, an output voltage Vout of the charge pump. Typically, as shown in FIG. 4, a resistor voltage divider is used as the feedback circuit 12; however, other circuits may be used instead as the feedback circuit 12. For instance, the power output terminal Vout may be connected to a feedback pin FB of the charge pump chip 40 either directly or through a resistor. The charge pump chip 40 includes an error amplifier 42 for amplifying the difference between the feedback signal FB and a target value Vref to generate an error signal S1 for an auto-sensing controller 44 to provide a mode transition signal Smode and a power switching signal Spower for a charge pump control logic 46 and a power switch Psw, respectively. The charge pump control logic 46 provides a control signal according to the mode transition signal Smode to switch an upper bridge element, MOSFET Q1 in this embodiment, of a driver 48. The driver 48 has a lower bridge element, MOSFET Q2 in this embodiment, controlled by the error signal S1. A buffer 50 is used to generate a control signal S2 from the error signal S1 for higher driving capability, and the control signal S2 is applied to the gate of the MOSFET Q2 via a connector 52 such that the on-resistance (Ron) of the MOSFET Q2 is controlled by the difference between the feedback signal FB and the target value Vref. Hence, the MOSFET Q2 functions as a voltage-controlled resistor whose on-resistance (Ron) is controlled by the difference between FB and Vref to compensate for the excessive voltage difference at output Vout, thereby fixing the output voltage Vout of the charge pump at the demanded level. The power switch Psw is switched by the power switching signal Spower to switch the power input terminals Vin1 and Vin2 to connect to the driver 48, and the auto-sensing controller 44 switches the power switch Psw by the power switching signal Spower to mix the input voltages Vin1 and Vin2 to modulate a maximum pumping voltage as close as to the demanded output voltage Vout. FIG. 5 is a circuit diagram of an embodiment for the auto-sensing controller 44 shown in FIG. 4, in which two comparators 54 and 56 compare the error signal S1 with a high-level reference VH and a low-level reference VL to generate two comparison signals, respectively, and according thereto, a mode controller 58 determines the power switching signal Spower and the mode transition signal Smode. Instead, the auto-sensing controller 44 may be implemented by a hysteresis comparator having thresholds VH and VL, by which the mode transition signal Smode will be a mode-up signal when the error signal S1 rises above VH, and a mode-down signal when the error signal S1 falls below VL.

Figure 6:
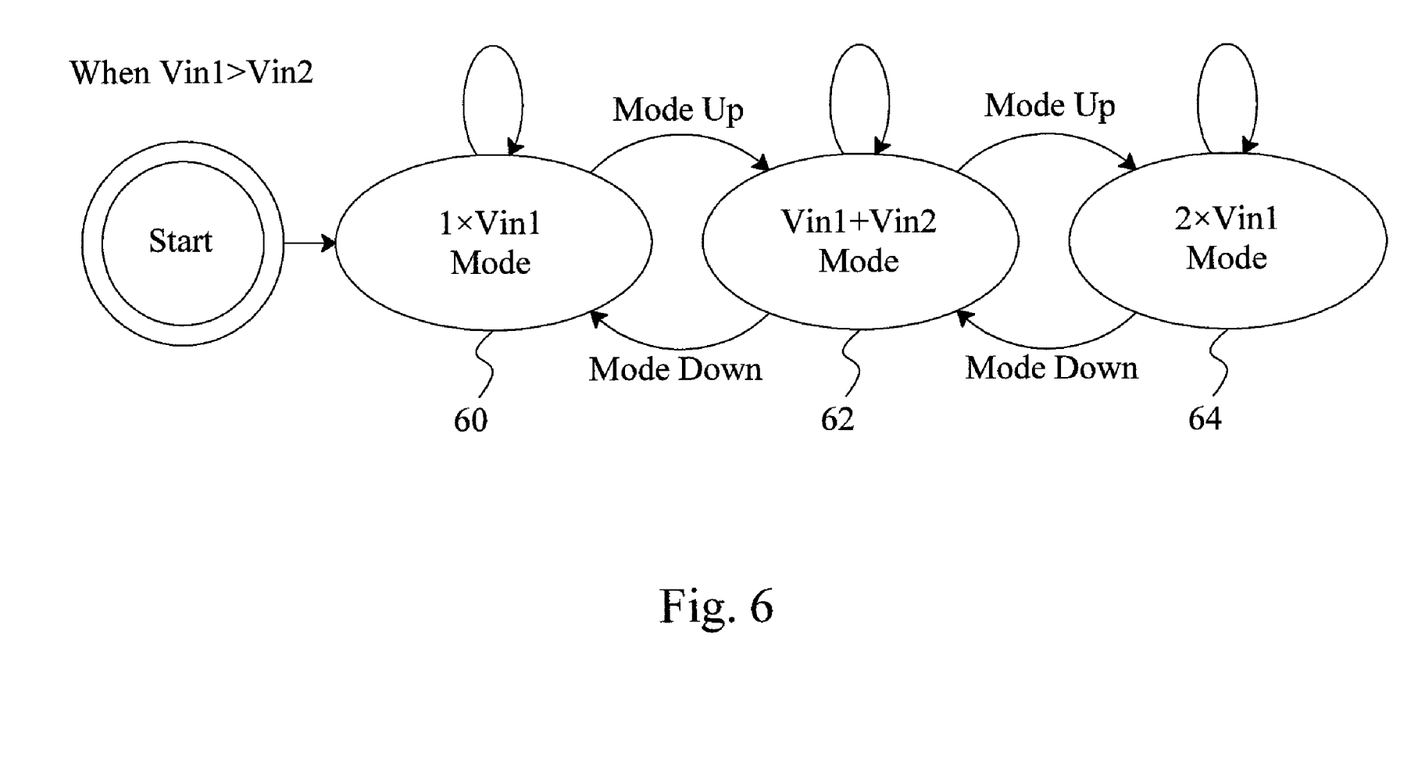
FIG. 6 is a mode transition chart of the charge pump shown in FIG. 4.

FIG. 6 is a mode transition chart of the charge pump shown in FIG. 4 when Vin1 is higher than Vin2. In addition to a 1×Vin1 mode 60 and a 2×Vin1 mode 64, the charge pump further provides a Vin1+Vin2 mode 62 whose maximum pumping voltage Vin1+Vin2 is between 1×Vin1 and 2×Vin1. In the 1×Vin1 mode 60, the charge pump keeps the MOSFET Q1 of the driver 48 off and modulates the output voltage Vout only by the difference between the feedback signal FB and the target value Vref. In the Vin1+Vin2 mode 62, the power switching signal Spower switches the power switch Psw to the power input terminal Vin2, the MOSFET Q1 of the driver 48 is turned off, and the MOSFET Q2 is turned on by the control signal S2 to charge the pumping capacitor C1. Then, when the pumping capacitor C1 is charged to a certain voltage, the MOSFET Q1 is turned on, thus shifting the potential of the pumping capacitor C1 by Vin2, and in consequence, a voltage higher than Vin2 is generated for charging the output capacitor Cout. This mode 62 can charge the output capacitor Cout to a maximum pumping voltage Vin1+Vin2. When the charge pump transits from the mode 62 to the 2×Vin1 mode 64, the power switching signal Spower switches the power switch Psw to the power input terminal Vin1, the MOSFET Q1 is first turned off to charge the pumping capacitor C1, and then turned on to shift the potential of the pumping capacitor Q1 by Vin1. Thus, a voltage higher than Vin1 is generated for charging the output capacitor Cout up to a maximum pumping voltage 2×Vin1. The mode transition is determined by the auto-sensing controller 44. If the error signal S1 is higher than the high-level reference VH, after a period time counted with a clock Clk, the charge pump will switch its mode down from the present mode. If the error signal S1 is lower than the low-level reference VL, after a period time counted with a clock Clk, the charge pump will switch its mode up from the present mode. If the error signal S1 remains between the references VH and VL, the charge pump will maintain at the present mode. With proper combination of different input voltages Vin1 and Vin2, the charge pump can generate a maximum pumping voltage closer to the demanded output voltage Vout to reduce the difference between the maximum pumping voltage and the output voltage Vout. As a result, the maximum efficiency of the charge pump is increased, the proportion of power consumption by the output stage is lowered, and the charge pump chip 40 is protected from overheating.

Figure 7:
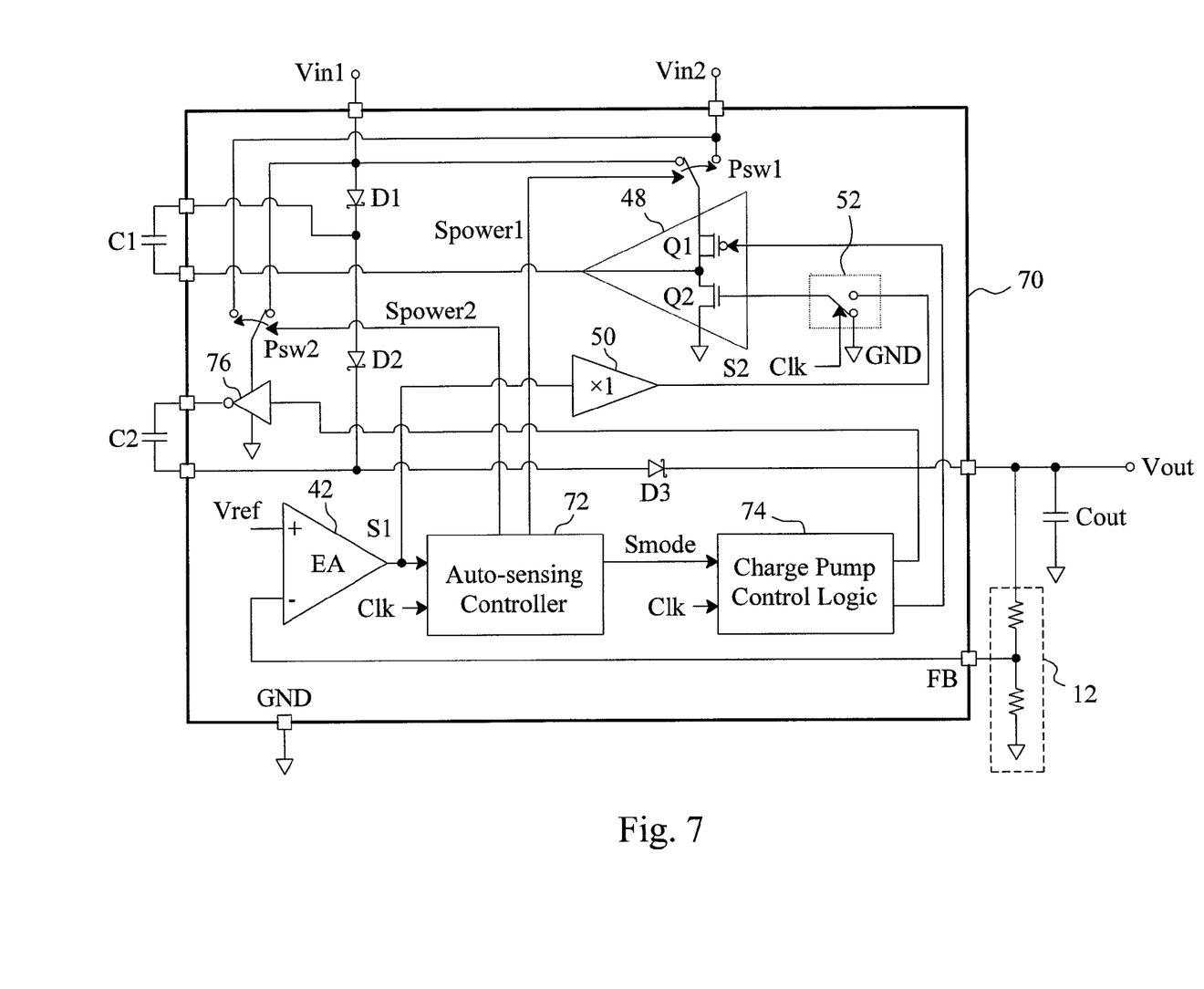
FIG. 7 is a circuit diagram of a second embodiment charge pump according to the present invention.

Based on the same principle, a charge pump having a higher multiplication factor can be made. For instance, FIG. 7 is a circuit diagram of a voltage-tripler charge pump according to the present invention, in which a charge pump chip 70 has the same error amplifier 42, driver 48, buffer 50, and connector 52 as the embodiment shown in FIG. 4. In the charge pump chip 70, however, an auto-sensing controller 72 provides a mode transition signal Smode and two power switching signals Spower1 and Spower2 according to the error signal S1. According to the mode transition signal Smode, a charge pump control logic 74 provides not only a control signal for switching the MOSFET Q1 of the driver 48, but also a control signal for a driver 76. In addition to a power switch Psw1 switched by the power switching signal Spower1 to switch the power input terminals Vin1 and Vin2 to connect to the driver 48, another power switch Psw2 is switched by the power switching signal Spower2 to switch the power input terminals Vin1 and Vin2 to connect to the driver 76. As in the embodiment shown in FIG. 4, the auto-sensing controller 72 in this embodiment determines the operation mode for the charge pump, and switches the power switches Psw1 and Psw2 to mix different input voltages Vin1 and Vin2 to generate a maximum pumping voltage as close as to the demanded output voltage Vout.

Figure 8:
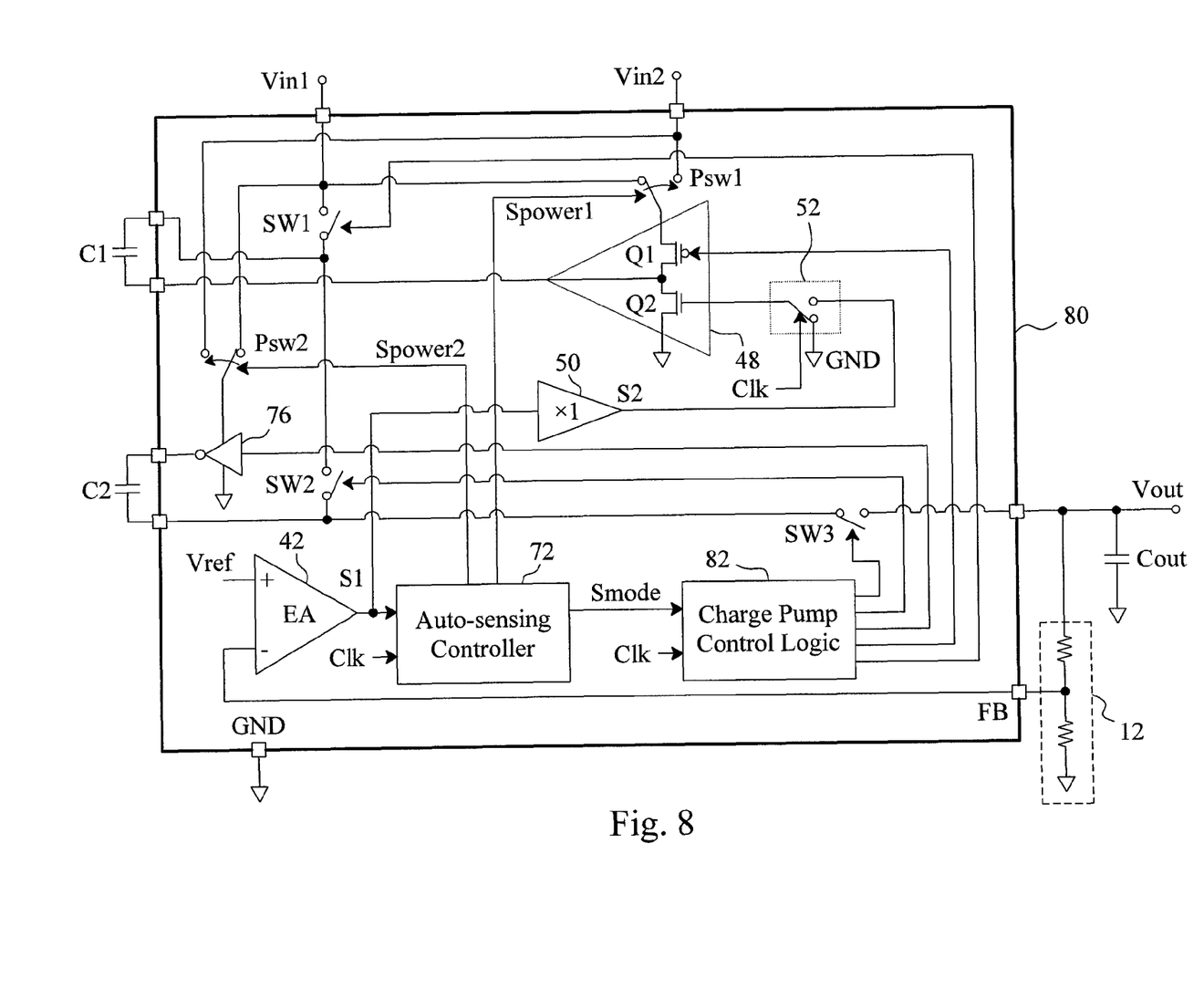
FIG. 8 is a circuit diagram of a third embodiment charge pump according to the present invention.

Replacement of the Schottky diodes D1, D2 and D3 shown in FIG. 7 with switches SW1, SW2 and SW3, respectively, results in another embodiment shown in FIG. 8, in which each of the switches SW1, SW2 and SW3 may be implemented by a power MOSFET. In this embodiment, a charge pump chip 80 has the same other components as the embodiment shown in FIG. 7, except that a charge pump control logic 82 further provides control signals for the switches SW1, SW2 and SW3.

Figure 9:
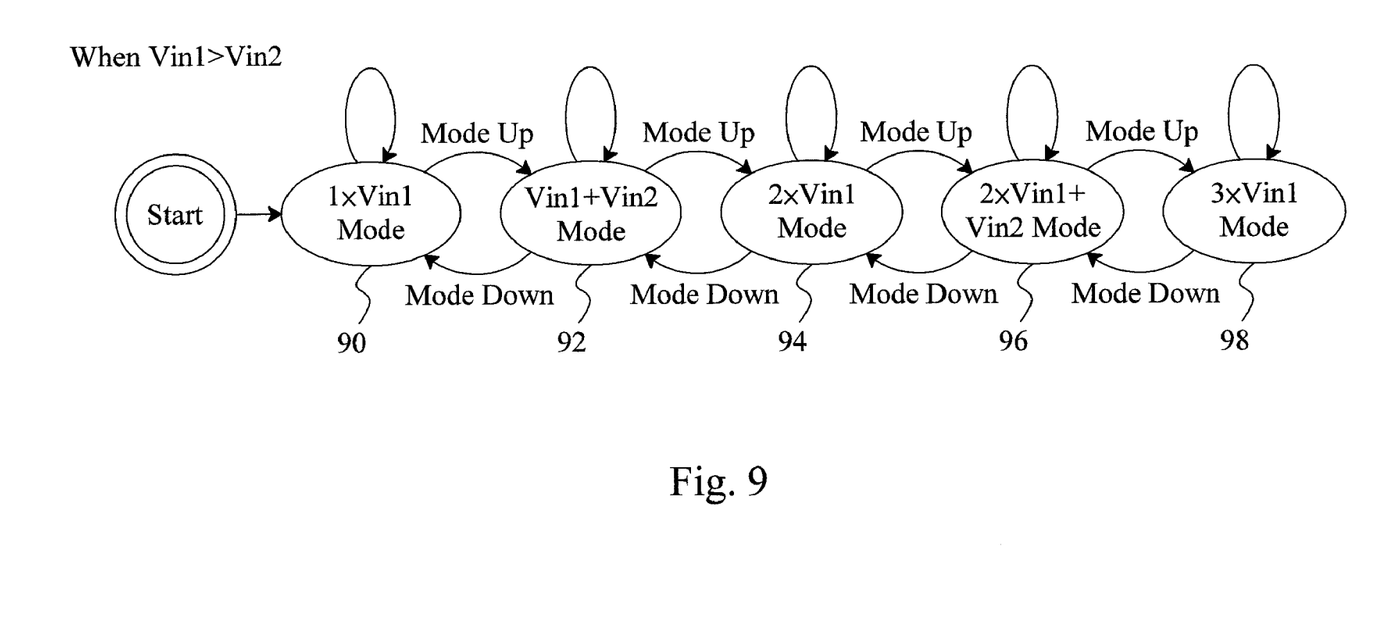
FIG. 9 is a mode transition chart of the charge pumps shown in FIGS. 7 and 8.

FIG. 9 is a mode transition chart of the charge pumps shown in FIGS. 7 and 8 when Vin1 is higher than Vin2. In addition to a 1×Vin1 mode 90, a 2×Vin1 mode 94, and a 3×Vin1 mode 98, by combining different input voltages Vin1 and Vin2, each of the charge pumps further provides a Vin1+Vin2 mode 92 and a 2×Vin1+Vin2 mode 96. Comparing FIG. 9 with FIG. 2, a charge pump according to the present invention can provide more operation modes and be capable of generating a maximum pumping voltage closer to the demanded output voltage Vout. The modes 90, 92 and 94 operate in the same way as the modes 60, 62 and 64 shown in FIG. 6, except that the driver 76 connects one terminal of the pumping capacitor C2 to ground. When the charge pump enters the mode 96 from the mode 94, the pumping capacitor C2, like the output capacitor Cout, has been charged to a voltage 2×Vin1. Then, when the pumping capacitor C2 is discharged, the pumping capacitor C1 is recharged, and at the same time, the power switching signal Spower2 switches the power switch Psw2 to the power input terminal Vin2 so that the driver 76 shifts the potential of the pumping capacitor C2 by Vin2 to charge the output capacitor Cout up to a maximum pumping voltage 2×Vin1+Vin2. When the charge pump is switched from the mode 96 to the mode 98, the power switching signal Spower2 switches the power switch Psw2 to the power input terminal Vin1 so that the driver 76 shifts the potential of the pumping capacitor C2 by Vin1 and thereby a voltage higher than 2×Vin1 is generated for charging the output capacitor Cout up to a maximum pumping voltage 3×Vin1. By mixing two different input voltages Vin1 and Vin2 in different ways, the charge pump can generate more maximum pumping voltages closer to the demanded output voltages Vout by using the auto-sensing controller 72 in judgment and control, resulting in significant efficiency and thermal improvement. The more different input voltages a charge pump employs, the more operation modes and maximum pumping voltages the charge pump can have, and the more significant efficiency and thermal improvement the charge pump can attain.

In further practice, an example is used for calculation of efficiencies of the conventional charge pumps shown in FIGS. 1 and 2 and the inventive charge pumps shown in FIGS. 7 and 8 to demonstrate the performance difference therebetween. For the conventional charge pump shown in FIG. 1 or 2, it is assumed that the input voltage Vin=10V, the output voltage Vout=22V, and the output loading current Iout=0.1 A. In order to provide the output voltage 22V, the conventional charge pump shown in FIG. 1 or 2 must operate in the ×3 mode 26, and thus has the maximum efficiency $\eta=(22\times100\%)/(3\times10)=73.3\%$, and the power consumption by the output stage is $(30-22)\times0.1=0.8$ W. By contrast, for the inventive charge pump shown in FIG. 7 or 8 to provide an output voltage 22V, the 2×Vin1+Vin2 mode 96 is used. Therefore, assuming that the additional input voltage Vin2=5V, the charge pump has the maximum efficiency $\eta=(22\times100\%)/(2\times10+5)=88\%$, and the power consumption by the output stage is $(25-22)\times0.1=0.3$ W. The below Table 1 summarizes the calculation results, and shows that the charge pump according to the present invention has higher efficiency and lower power consumption by the output stage.

TABLE 1

| | Vin1 (V) | Vin2 (V) | Vout (V) | Iout (A) | Maximum pumping voltage (V) | Power consumption by output stage (W) | Efficiency (%) |
|---|---|---|---|---|---|---|---|
| Prior arts | 10 | — | 22 | 0.1 | 3 Vin = 30 | 0.8 | 73.33 |
| Present invention | 10 | 5 | 22 | 0.1 | 2 Vin1 + Vin2 = 25 | 0.3 | 88.00 |

As demonstrated by the embodiments described above, regardless of using Schottky diodes or power MOSFETs as its output stage and, the charge pump according to the present invention mixes different input voltages Vin1 and Vin2 under auto-sensing control to modulate the maximum pumping voltage to minimize the difference between the maximum pumping voltage and the demanded output voltage, and thereby has higher efficiency and less heat generated from power consumption. Based on the demonstration, a person skilled in the art may design charge pumps whose multiplication factors are different from the foregoing or which use more input voltages than the embodiments disclosed herein.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A charge pump, comprising:
a plurality of power input terminals for receiving different input voltages;
a power output terminal for supplying an output voltage;
an output stage switched between one of the power input terminals and the power output terminal;
a pumping capacitor connected to the output stage;
an output capacitor connected to the power output terminal;
a feedback circuit connected to the power output terminal, operative to provide a feedback signal related to the output voltage; and
a control circuit connected to the feedback circuit, the output stage, and the plurality of power input terminals, operative to control charging and discharging of the pumping capacitor according to the feedback signal and a target value, to charge the output capacitor to generate the output voltage,
wherein the control circuit comprises:
an error amplifier connected to the feedback circuit for amplifying a difference between the feedback signal and the target value to generate an error signal;
an auto-sensing controller connected to the error amplifier, operative to generate a mode transition signal and a power switching signal according to the error signal;
a charge pump control logic connected to the auto-sensing controller, operative to generate a control signal according to the mode transition signal;
a driver connected to the pumping capacitor and the charge pump control logic, operative to apply a voltage to a terminal of the pumping capacitor according to the error signal and the control signal; and
a power switch connected to the driver for switching the plurality of power input terminals to connect to the driver according to the power switching signal.

2. The charge pump of claim 1, wherein the auto-sensing controller comprises:
a first comparator connected to the error amplifier for comparing the error signal with a high-level reference to generate a first comparison signal;
a second comparator connected to the error amplifier for comparing the error signal with a low-level reference to generate a second comparison signal; and
a mode controller connected to the first and second comparators, operative to determine the mode transition signal and the power switching signal according to the first and second comparison signals.

3. The charge pump of claim 1, wherein the driver comprises:
an upper bridge element connected between the power switch and the terminal of the pumping capacitor, for being switched by the control signal; and
a lower bridge element connected between the terminal of the pumping capacitor and a ground terminal, for being controlled by the error signal.

4. The charge pump of claim 3, wherein the lower bridge element comprises a MOSFET.

5. The charge pump of claim 4, wherein the control circuit further comprises:
a connector connected to a gate of the MOSFET; and
a buffer connected between the error amplifier and the connector for applying the error signal to the gate of the MOSFET via the connector.

6. The charge pump of claim 1, wherein the auto-sensing controller switches the power switch by the power switching signal to switch the plurality of power input terminals to connect to the driver to modulate a maximum pumping voltage.

7. A control circuit for a charge pump, comprising:
an error amplifier for amplifying a difference between a feedback signal related to an output voltage of the charge pump and a target value to generate an error signal;
an auto-sensing controller connected to the error amplifier, operative to generate a mode transition signal and a power switching signal according to the error signal;
a charge pump control logic connected to the auto-sensing controller, operative to generate a control signal according to the mode transition signal;
a driver connected to the charge pump control logic; and
a power switch connected to the driver for applying different input voltages to the driver according to the power switching signal,
wherein the auto-sensing controller comprises:
a first comparator connected to the error amplifier for comparing the error signal with a high-level reference to generate a first comparison signal;
a second comparator connected to the error amplifier for comparing the error signal with a low-level reference to generate a second comparison signal; and
a mode controller connected to the first and second comparators, operative to determine the mode transition signal and the power switching signal according to the first and second comparison signals.

8. The control circuit of claim 7, wherein the driver comprises an upper bridge element and a lower bridge element connected in series between the power switch and a ground terminal, the upper bridge element being switched by the control signal, the lower bridge element being controlled by the error signal.

9. The control circuit of claim 8, wherein the lower bridge element comprises a MOSFET.

10. The control circuit of claim 9, further comprising:
a connector connected to a gate of the MOSFET; and
a buffer connected between the error amplifier and the connector for applying the error signal to the gate of the MOSFET via the connector.

11. An operation method for a charge pump, comprising the steps of:
(A) amplifying a difference between a feedback signal related to an output voltage of the charge pump and a target value for generating an error signal;
(B) generating a mode transition signal and a power switching signal according to the error signal, comparing the error signal with a high-level reference for generating a first comparison signal, comparing the error signal with a low-level reference for generating a second comparison signal, and determining the mode transition signal and the power switching signal according to the first and second comparison signals;
(C) determining an operation mode for the charge pump according to the mode transition signal;
(D) generating a control signal according to the mode transition signal;
(E) controlling charging and discharging of a pumping capacitor according to the error signal and the control signal; and
(F) switching different input voltages to apply to the pumping capacitor according to the power switching signal for modulating a maximum pumping voltage.

* * * * *